United States Patent

[11] 3,623,471

[72] Inventors John C. Bogue
 1036 S. 1st St., Santa Monica, Calif. 91006;
 Robert I. Sarbacher, 101 Ocean Ave., Arcadia, Calif. 90402
[21] Appl. No. 885,261
[22] Filed Dec. 15, 1969
[45] Patented Nov. 30, 1971

[54] WRAPAROUND BATTERY AND HEATER
 12 Claims, 8 Drawing Figs.
[52] U.S. Cl. ................................................ 126/263
[51] Int. Cl. ................................................ F24j 3/00
[50] Field of Search ...................................... 126/262, 263

[56] References Cited
 UNITED STATES PATENTS
3,207,149 9/1965 Spindler .......................... 126/263
3,513,827 5/1970 Egger ............................. 126/262

Primary Examiner—Charles J. Myhre
Attorney—Witherspoon and Lane

ABSTRACT: A reserve battery acting as a heating element is designed for heating the contents of a food package or container. The battery is energized at the time the contents are to be heated by releasing the electrolyte into the electrode compartment of the battery. The battery may be designed of flexible electrodes and separator and is readily wrapped around the package or container of the material to be heated. Another configuration may be inserted into a cavity in the package or container. Still another configuration may be sandwiched between two flat objects to be heated. The battery is effectively short circuited upon itself so as to generate heat evenly over the surface of the package or container. In the wraparound configuration of the battery, a special flexible insulating cover is built into the battery to reflect heat which would otherwise escape into the surrounding atmosphere and also provide protection in handling after activation.

PATENTED NOV 30 1971    3,623,471

INVENTORS
JOHN C. BOGUE
ROBERT I. SARBACHER

BY

ATTORNEY

WRAPAROUND BATTERY AND HEATER

BACKGROUND OF INVENTION

There are a number of instances where it is desirable to heat the contents of a package or container as for example the contents of a can of soup in a lunch or picnic basket where it is desired to use such contents immediately after heating, or where a soldier desires to heat a C-ration allotment, but has no heating facilities or is unable to start a fire because of detection. Such instances may also arise when power for heating such contents are remote and not reasonably accessible as in new building construction in remote areas. Some building materials such as vinyl or asphalt tile may require heating in cold weather before installation. There are of course many other instances where heat may be required and conventional heat sources are either not available or for some reason not desirable.

This invention provides a heat source that can be used in many different situations including but not limited to those situations where conventional heat sources are not available or not desirable. In other words, this invention provides a heat source that has general utility and is particularly useful where heat is to be applied to objects such as packages, cans of food, flat objects and the like.

SUMMARY OF THE INVENTION

The present invention relates to the design of electrical heating elements wherein the reserve battery electrodes themselves generate the heat that is produced when the battery is energized. In particular it relates to such batteries whose shelf life prior to activation is essentially unlimited and whose life once activated is sufficiently long to produce the heat required for the specific application to which it is placed.

One aspect of the heating elements of the present invention is the use of reserve batteries. Reserve primary batteries are known to the art. They are batteries wherein the electrodes are fully assembled for operation, but the electrolyte is held in reserve in a separate container which may be within the battery housing. Since there is no consumption of the electrodes under these circumstances the shelf life of the battery is essentially indefinite. However, once the electrolyte is released from its reserve container, such as by mechanical puncture, explosive squib rupture, pressure sufficient to rupture, or any other means as are well known in the art, the battery is activated, and thereafter has a limited life.

In accordance with the present invention, a series of short-circuited reserve primary batteries are employed in parallel and have a pressure activation system or a mechanical puncture system incorporated to release the electrolyte when desired.

Three methods for utilizing the short circuited primary reserve battery are described. One of these methods describes a system of batteries designed to be wrapped around the material to be heated. Another method describes a system of batteries designed to be sandwiched between two materials to be heated and the third method describes a single battery of cells which may be inserted in a cavity in a container the contents of which is to be heated.

It is therefore one object of the present invention to provide heating elements requiring no separate or outside power source to heat the contents of a package or container.

Another object of this invention is to provide heating elements having a specific heat content capability to raise the temperature of the contents of a given package or container a specific amount.

Still another object of this invention is to provide a flat flexible heating element which may be wrapped around the object to be heated.

Still another object of this invention is to provide a flat, flexible heating element which may be sandwiched between two objects to be heated.

Still another object of this invention is to provide a self-contained heating element which may be inserted in a cavity in a container, the contents of which are to be heated.

Other objects and advantages of the present invention will become apparent to those skilled in the art from a consideration of the following exemplary detailed description of the specific embodiment of the invention in conjunction with the drawings provided.

LIST OF FIGURES

DETAILED DESCRIPTION OF INVENTION

For the purposes of illustration, the present invention is described herein as embodied in a magnesium/magnesium perchlorate, lithium perchlorate/mercuric oxide cell; however, the features of this invention are not limited to this cell.

Figure 1:
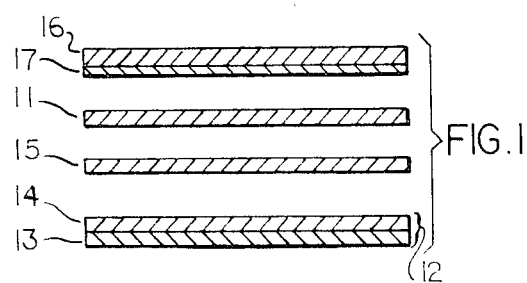
FIG. 1 is a schematic exploded view of a partial battery of cells as contemplated by the present invention for one form of a wrap around heater.

In the exploded schematic illustration of FIG. 1, a partial battery of cells is illustrated showing one anode and one cathode.

The anode 11 is formed from magnesium sheet stock, such as produced by Dow Chemical Company under the designation AZ-21 or AZ-31, preferably about 0.004 inch in thickness. The cathode 12 comprises a stainless steel sheet 13 approximately 0.001 inch thick as a structural base element, one side of which is coated with a mercuric oxide paste 14. A thin absorbent fibrous separator 15, which may be a filter paper stock is interposed between the anode 11 and the cathode 12 and carries the electrolytic solution when activated.

Figure 3:
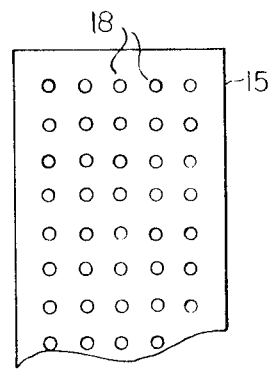
FIG. 3 is a face view of a fragment of the separator used in these cells in accordance with the present invention.

The physical structure of the separator 15 is illustrated in face view in FIG. 3. This element 15 is made foraminous by punching holes 18 there through. Optimumly, each hole 18 is about one-sixteenth inch in diameter, and they are uniformly distributed with a spacing that provides about 20 holes per square inch of surface area.

The stainless steel element 13 is coated with the mercuric oxide paste 14. This paste is prepared by mixing mercuric oxide with carbon black to improve conductivity in the weight ratio of about 9.5 to 1 together with a small amount of a suitable binder, such as about 0.05 percent by weight of carborymethylcellulose. This mixture is ball milled dry for about an hour and then enough water is added to make a thick paste and it is further ball milled for an additional hour. The resultant mixture is spread in a thin layer about one sixty-fourth inch thick over the surface of the stainless steel element 13 prepared as above described. Cathode 12 thus prepared is dried in an oven at about 200° F. for about 30 minutes with the separator 15 pressed into the mercuric oxide paste so that the holes 18 in the separator are filled with paste.

In the wrap around configuration of, an battery the insulating plastic sheet 16 (FIG. 1) is coated on one side with a thin aluminum film 17 which may be evaporated on the plastic by well-known methods. The aluminum serves to reflect heat generated in the battery back into the cell and to the container or package about which the battery is wrapped. The surface formed by the stainless steel element 13 is one side of the battery, while the plastic sheet 16 is the other side forming in this manner the container of the cells. All sides of the battery are sealed by a plastic strip which is welded to the plastic 16 on one side and the stainless steel 13 on the other.

Figure 4:
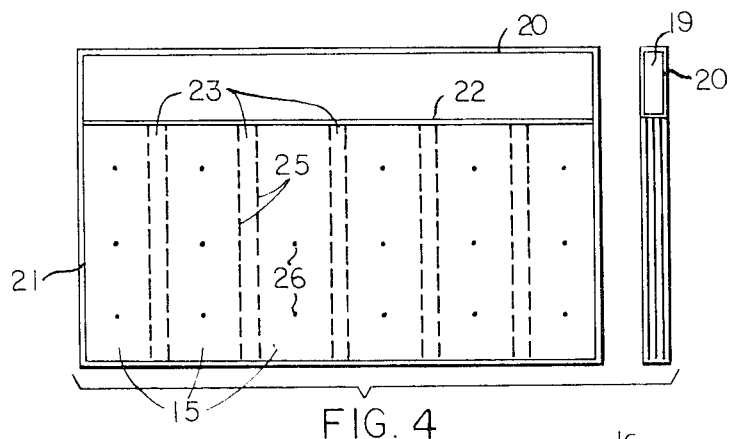
FIG. 4 shows two views of the flat construction of the battery, plan, and side view in accordance with the present invention.

FIG. 4 represents two views of the assembled series of cells. The electrolyte container is a plastic bag 20 running the length of the flat sheet 21 with partially perforated openings along the lower edge 22. When pressure is applied to the bag 20 the electrolyte 19 is released and if held in the proper position, upright, will flow down the channels 23 and be absorbed by the separator 15, in this manner activating the heating action.

The holes 18 in the separator 15 effectively form short circuits for the cells, and because of their uniform spacing produce virtually constant heat gradient along the flat surface of the stainless steel element 13 and the magnesium anode 11. When the battery is wrapped around the container to be heated, the heat generated in the battery is transmitted through the stainless steel 13 to the container and then to the material to be heated.

The electrolyte 19 may employ a 5 normal aqueous perchlorate solution of magnesium and lithium in the ratio of 95 to 5 by weight.

Figure 5:
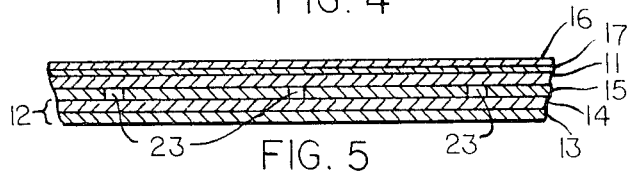
FIG. 5 is a horizontal cross-sectional and fragmentary detailed view of a partial battery embodying the principles of the present invention.

The cross-sectional view of the battery is shown in FIG. 5 where the components 13 through 17 are indicated. The separator 15 is cut in sections about 1 inch wide in assembly and spaced along the length of the battery as shown by the dotted line 25 so as to create the channels 23 through which the electrolyte 19 may pass when released Small metallic or plastic rivets 26 may be inserted holding the outside surfaces of the battery together. These should pass through the center of the width of the separator 15 and about 2 inches apart, in length.

If it is desired to heat two reasonably flat objects at the same time so that the battery may be sandwiched between them, then the plastic material 16 with aluminum coating 17 is not required.

Figure 2:
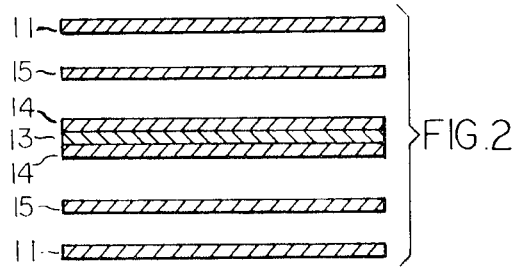
FIG. 2 is a schematic exploded view of a partial battery of cells as contemplated by the present invention for another form of a heater.

In this event the electrode arrangement may take the form indicated in FIG. 2 where the stainless steel element 13 is coated on both sides with the mercuric oxide paste 14 to form the cathode electrode. It may be desirable to punch holes in the stainless steel element 13 in a similar manner as described for the separator 15. In this configuration the heating element is enclosed on both sides by the magnesium anode electrodes 11 which form the enclosure for the battery-heater. The edges are sealed as described for the wrap around heater FIG. 4. Also, rivets binding both sides together spaced as described for the wraparound heater may be inserted either of metal or plastic.

Figure 6:
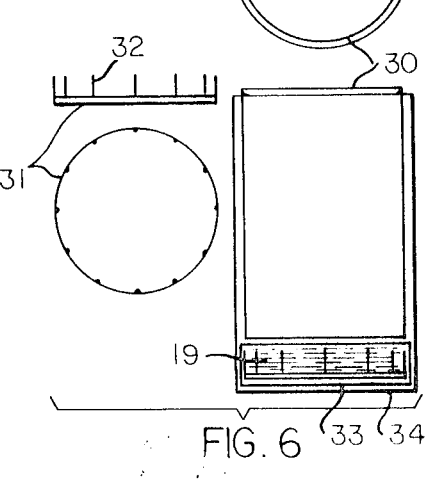
FIG. 6 is an illustration of one effective mode of arranging the heater and electrolyte container in accordance with the present invention.

In the event it is desired to fasten the battery on a can or container so that it may be used as a label 35 for the can, an arrangement such as shown in FIG. 6 may be used. Here the electrolyte 19 may be contained in a compartment in or attached to the bottom of the can 30 as indicated. In order to release the electrolyte 19 into the channels 23, a circular plastic disc 31 with sharp projections 32 is included in the electrolyte compartment 33 in such a manner that by depressing the bottom of the container 34 the projections 32 will break the seal between the electrolyte compartment 33 and the channels 23 permitting the electrolyte 19 to enter the separators 15 and activate the battery. Inversion of the can will aid the flow of electrolyte.

Figure 7:
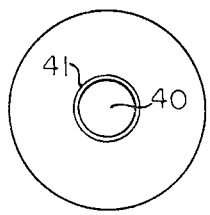
FIG. 7 is an illustration of another effective mode of arranging the heating elements in a container in accordance with the present invention.
Figure 7:
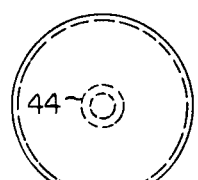
Figure 7:
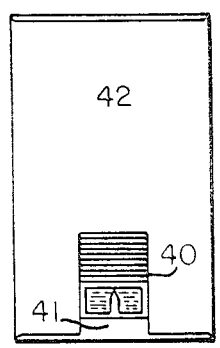

By manufacturing the electrodes in a rectangular or disc configuration, the battery may be assembled in the form of a rectangle or cylinder. Holes in the separator between anode and cathode effectively short circuit the battery when activated so that it becomes an effective heat source. It should be noted that these batteries have no external terminals. Depression of a plunger will activate the battery when the assembly of battery and container is inverted. FIG. 7 shows a cross-sectional view of such a cell 40 placed in a cavity 41 in the container 42. Cell 40 can be as thin as one-sixteenth of an inch.

Figure 8:
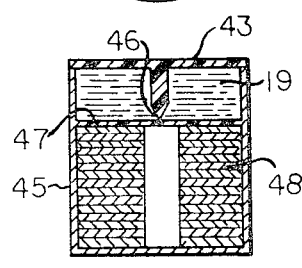
FIG. 8 is an illustration of one form of reserve cell assembled in accordance with the principles of the present invention.

A cylindrical battery-heater element is indicated in FIG. 8. The anodes, cathodes and separators are here, made in the form of a disc with a hole 44 in the center of each to permit the electrolyte to reach the interelectrode space occupied by the separator 15 as quickly as possible after activation by pressing the plastic top 43 of the metal container 45. The sharp point 46 breaks the electrolyte container 47 releasing the electrolyte 19 into the electrode compartment 48 thus activating the heating element.

Having thus described the present invention by reference to a specific embodiment thereof, it is not intended that the invention be limited thereto for numerous variations and modifications will be apparent to those skilled in the art. Such modification and variations as are embraced by the spirit and scope of the appended claims are contemplated as being within the purview of the present invention.

What is claimed is:

1. A heat source comprising: an electrochemical reserve primary cell battery having an anode, a cathode, a perforated absorbent separator sandwiched between said anode and cathode in such a manner that said anode and cathode are in short circuiting contact through said perforations, and an electrolyte, said electrolyte being stored in a rupturable compartment to isolate said electrolyte from said anode and cathode until said heat source is to be activated and means to rupture said rupturable compartment to permit the electrolyte to flow into said absorbent separator thereby activating said heat source.

2. The heat source as defined in claim 1 wherein said anode forms one side of the battery container and said cathode forms the other side of the battery container.

3. The heat source as set forth in claim 1 wherein said anode and said cathode are made of materials which are thin and flexible thereby providing a flexible battery.

4. The heat source as defined in claim 1 wherein said rupturable electrolyte container is made of flexible plastic and said means to rupture said container comprises means to apply pressure to said flexible plastic container, said flexible plastic container being so positioned that rupture of said flexible container by said pressure application means releases said electrolyte into the anode and cathode interelectrode space occupied by said absorbent separator.

5. The heat source as defined in claim 1 wherein channels are provided between the anode and cathode to permit rapid disbursement of said electrolyte throughout said separator upon the release of said electrolyte from said rupturable container.

6. The heat source as defined in claim 4 wherein said heat source is affixed to a container as the label for said container.

7. The heat source as defined in claim 5 wherein said heat source is affixed to a container as the label for said container.

8. The heat source as defined in claim 1 wherein said anode, cathode and separator are positioned coaxially and encapsulated to form a heat source suitable for insertion into a material that is to be heated.

9. The heat source as defined in claim 1 wherein said anode, cathode and separator are positioned coaxially and encapsulated to form a heat source suitable for insertion into a cavity formed in a container that is to be heated.

10. The heat source as defined in claim 4 wherein an insulatory and reflectory material is provided as one side of said battery to aid in the containment of heat and to provide a means for safe handling of said heat source after said battery has been activated.

11. The heat source as defined in claim 5 wherein an insulatory and reflectory material is provided as one side of said battery to aid in the containment of heat and to provide a means for safe handling of said heat source after said battery has been activated.

12. The heat source as defined in claim 1 wherein said anode forms both sides of the battery container thereby providing a heat source that can be sandwiched between two objects that are to be heated.

* * * * *